United States Patent
Tripathi et al.

(10) Patent No.: US 10,838,639 B2
(45) Date of Patent: Nov. 17, 2020

(54) INTELLIGENT REDUNDANT ARRAY OF INDEPENDENT DISKS

(71) Applicant: Intelliflash by DDN, Inc., Santa Clara, CA (US)

(72) Inventors: Shailendra Tripathi, Fremont, CA (US); Sreekanth Garigala, Fremont, CA (US)

(73) Assignee: INTELLIFLASH BY DDN, INC., Santa Clara, CA (US)

( * ) Notice: Subject to any disclaimer, the term of this patent is extended or adjusted under 35 U.S.C. 154(b) by 0 days.

(21) Appl. No.: 15/700,912

(22) Filed: Sep. 11, 2017

(65) Prior Publication Data

US 2019/0056865 A1    Feb. 21, 2019

Related U.S. Application Data

(60) Provisional application No. 62/546,114, filed on Aug. 16, 2017.

(51) Int. Cl.
*G06F 3/06*    (2006.01)

(52) U.S. Cl.
CPC ............ *G06F 3/064* (2013.01); *G06F 3/0607* (2013.01); *G06F 3/0631* (2013.01); *G06F 3/0688* (2013.01); *G06F 3/0689* (2013.01)

(58) Field of Classification Search
CPC ...... G06F 3/064; G06F 3/0631; G06F 3/0689; G06F 3/0688; G06F 3/0607
USPC ......................................................... 711/114
See application file for complete search history.

(56) References Cited

U.S. PATENT DOCUMENTS

| | | | |
|---|---|---|---|
| 6,182,089 B1* | 1/2001 | Ganapathy | G06F 12/023 |
| 7,958,304 B1* | 6/2011 | Goel | G06F 11/1096 711/114 |
| 9,838,477 B2* | 12/2017 | Mu | H04L 67/1097 |
| 2003/0188101 A1 | 10/2003 | Fore et al. | |
| 2003/0220951 A1 | 11/2003 | Muthulingam et al. | |
| 2004/0210731 A1 | 10/2004 | Chatterjee et al. | |
| 2008/0301256 A1* | 12/2008 | McWilliams | G06F 12/0284 709/214 |
| 2012/0011317 A1 | 1/2012 | Ikeuchi et al. | |
| 2012/0203994 A1 | 8/2012 | Burka et al. | |

(Continued)

*Primary Examiner* — David Yi
*Assistant Examiner* — Zubair Ahmed
(74) *Attorney, Agent, or Firm* — David R. Stevens; Stevens Law Group (57) ABSTRACT

A disclosed method for managing a RAID (redundant array of independent devices) file system memory comprises coalescing small read and write chunks into reasonably sized coalesced chunks up to 1 MB without any small size I/Os. The method also includes creating a new mapping layer configured to map the small size chunks in the coalesced chunks. The method additionally comprises flushing the coalesced chunks by allocating large chunks based on a chunk size coalescence or on a check point hit in terms of a SPA Sync. The method may also include applying a dynamic parity algorithm on the coalesced chunks to generate parities and data fragmented columns in reasonably big sized chunks. The method may yet include creating an appropriate coalesced chunk header to maintain the new mapping layer. The method may still comprise generating a chunked block pointer and a regular block pointer configured to co-exist in dual process threads.

17 Claims, 9 Drawing Sheets

(56) References Cited

U.S. PATENT DOCUMENTS

| | | | |
|---|---|---|---|
| 2013/0007381 A1* | 1/2013 | Palmer | G06F 12/04 |
| | | | 711/154 |
| 2013/0073813 A1 | 3/2013 | Bacik | |
| 2014/0164730 A1 | 6/2014 | Gold et al. | |
| 2014/0279849 A1 | 9/2014 | Zhang et al. | |
| 2015/0006846 A1* | 1/2015 | Youngworth | G06F 3/0689 |
| | | | 711/216 |
| 2015/0248402 A1 | 9/2015 | Patterson, III et al. | |
| 2015/0339221 A1* | 11/2015 | Fair | G06F 3/061 |
| | | | 711/118 |
| 2016/0110121 A1 | 4/2016 | Singh et al. | |
| 2017/0123666 A1* | 5/2017 | Sinclair | G06F 3/0604 |
| 2017/0177235 A1* | 6/2017 | Nishikubo | G06F 3/0659 |
| 2017/0206020 A1 | 7/2017 | Brown et al. | |
| 2017/0262191 A1* | 9/2017 | Dewakar | G06F 3/0611 |
| 2018/0018233 A1 | 1/2018 | Kim et al. | |

\* cited by examiner

INTELLIGENT REDUNDANT ARRAY OF INDEPENDENT DISKS

CROSS-REFERENCE TO RELATED APPLICATION

This application claims the benefit of the priority date of earlier filed U.S. Provisional Patent Application Ser. No. 62/546,114, titled 'Intelligent Redundant Array of Independent Disks' filed Aug. 16, 2017, and is incorporated herein by reference in its entirety.

BACKGROUND OF THE INVENTION

The ZetaByte File System (ZFS) uses a logging mechanism, the ZFS intent log (ZIL) to store synchronous writes, until they're safely written to the main data structure in the memory storage pool. The speed at which data can be written to the ZIL determines the speed at which synchronous write requests can be serviced: the faster the ZIL, the faster most databases, NFS and other important write operations become. Normally, the ZIL is part of the regular memory pool on storage disk. But ZFS offers the possibility to use a dedicated device for the ZIL. This is then called a "log device".

ZFS also has a sophisticated cache called the "Adaptive Replacement Cache" (ARC) where it stores both most frequently used blocks of data and most recently used ones. The ARC is stored in RAM, so each block of data that is found in the RAM can be delivered quickly to the application, instead of having to fetch it again from disk. When RAM is full, data needs to be thrown out of the cache and is not available any more to accelerate reads.

Solid-state arrays (SSA) have moved the external controller-based storage array market from a relatively stagnant incrementally improving market with slow-changing dynamics to a progressive neoclassical market. Improvements in the dynamics of many factors—such as reduced storage administration, power, cooling, rack space, increased performance and density—have changed the accepted assumptions of the previous SAN storage array market. Many vendors design and develop their own custom solid-state solutions. Consequently, more vendors are offering alternate solid-state media form factors with denser and faster systems when they create their own NAND flash storage packaging. From a whole system perspective, the largest SSAs now scale to 3.9 PB, and next-generation SSD technology and interconnects will again redefine performance capabilities, creating demand for faster storage networks.

Neither the solid-state array, nor the storage array administrator is the bottleneck anymore; but network latency has become the challenge. This has extended the requirement and life span for 16 Gbps and 32 Gbps Fibre Channel SANs, as Ethernet-based networks and related storage protocols struggle to keep up. Many new vendors have entered the market who provide comprehensive service management, and along with many traditional storage vendors, they continue to transition their portfolios from HDD-based arrays to all solid-state arrays.

Therefore, an SSA that is two to three times more expensive to purchase becomes a cost-effective replacement for a hybrid or general-purpose array at increased utilization rates. With regard to performance, one SSD can typically replace multiple HDDs, combined with data reduction features and increased storage administrator productivity the price point at which SSA investment decisions are made is dropping rapidly. Redundant array of independent disks (RAID) rebuild times for high-capacity SSDs are also faster than for high-capacity HDDs. Therefore, as HDD storage capacities increase, so do HDD recovery times, and SSAs reduce the risk exposure during any media failure and recovery window. Use cases for SSAs are moving into analytics, file and object workloads, and some customers even use SSAs as backup targets to reduce backup and restore windows.

Price and ownership programs translate into very competitive purchase prices for buyers, but vendors are faced with challenges to becoming profitable as incumbent vendors discount to avoid losing market share and new vendors discount to attract new customers. Because the SSA market has expanded rapidly with SSD reliability being equal to or better than HDD arrays, and feature parity also equalizing, the competitive battle to differentiate has moved to ease of ownership, and remote and pre-emptive support capabilities.

In contrast to block and file I/O storage systems, when an object is stored in Object addressable data storage systems (OAS), the object is given a name that uniquely identifies it and that also specifies its storage location. This type of data access therefore may eliminate the need for a table index in a metadata store and it may not be necessary to track the location of data in the metadata. An OAS receives and processes access requests via an object identifier that identifies a data unit or other content unit rather than an address that specifies where the data unit is physically or logically stored in the storage system.

In OAS, a content unit may be identified using its object identifier and the object identifier may be independent of both the physical and logical locations where the content unit is stored. In other words, the object identifier does not control where the content unit is logically or physically stored. Thus, if a physical or logical location of a content unit changes, the identifier for access to the unit of content may remain the same. Thus, an application program may simply track the name and/or location of a file rather than tracking the block addresses of each of the blocks on disk that store the content.

Many storage systems have separate systems to de-duplicate and compress data and replication software is often added post system build. Server vendors have used available building blocks to slash server prices dramatically, yet storage incumbents continue to overcharge customers for their storage servers. Architectural complexity, non-integrated products, expensive proprietary networking protocols, cumbersome administration and licensing for every module of software are the norm and burden storage consumers with high prices and high maintenance.

Modern computing ecosystems rely on resilient data availability for most of their functions. This translates directly into failure-resilient storage systems, which have fostered the development of strategies in storage server solutions like clustering (multiple computers per file system), shared storage, and splitting of compute and file-system responsibilities. Simultaneously, the network file-system protocols like CIFS (Common Internet File System) and NFS (Network File System) have undergone modifications that allow applications running on remote clients to receive a seamless flow of data, irrespective of storage node failures at the server. This is primarily achieved by making the storage server cluster guarantee that once a client acquires a handle on a file by opening it, the cluster and not a specific node will honor client interactions for this file-handle. This guarantee has major implications to the manner in which client's file-handle data must be stored on a storage server.

In a traditional storage server, the storage host node, which services the client's request for opening a file, creates an in-memory context for the client's request to open the file and refers to it for all further client operations using the file-handle that it returns to the client as a part of an open response till the client relinquishes the file-handle, typically through a file-close.

This in-memory context, or client's file-handle info, can be grouped into the following categories. Mode of usage: The manner in which the client wishes to use the file, e.g. read, write, execute, delete etc. Mode of shared usage: The manner in which the client allows other clients to use this file concurrently. Locking information: The extent of the file over which the client wishes exclusive access. This state may also contain information about any soft-lock or opportunistic lock that the client holds for caching read and writes to the file locally. Any application specific context that the client wishes to save as opaque metadata for the lifetime of the file-handle.

For a failure-resilient storage system, this in-memory state, referred to as 'persistent-handle-info' or PHDL-info hereafter, must be made available to other nodes of the system, so that in the event of primary node failure, any other node in the storage cluster can serve the data to clients once the latter present their persistent-handles for reconnection. However, storing the persistent-handle-info for long time-intervals can cause considerable memory consumption on the storage server.

SUMMARY OF THE INVENTION

A disclosed method for managing a RAID (redundant array of independent devices) file system memory, the method comprising coalescing a plurality of small read and write chunks into reasonably sized coalesced chunks up to 1 MB without any small size I/Os (input/outputs). The method also comprising creating a new mapping layer configured to map the small size chunks in the coalesced chunks. The method additionally comprising flushing the coalesced chunks by allocating large chunks based on a chunk size coalescence or on a check point hit in terms of a SPA Sync. The method may also further comprise applying a dynamic parity algorithm on the coalesced chunks to generate parities and data fragmented columns in reasonably big sized chunks. The method may yet comprise creating an appropriate coalesced chunk header to maintain the new mapping layer. The method may still comprise generating a chunked block pointer and a regular block pointer configured to co-exist in dual process threads.

A system disclosed for managing a RAID (redundant array of independent devices) file system memory comprises a coalescing module configured to coalesce small read and write chunks into reasonably sized coalesced chunks up to 1 MB without any small size I/Os (input/outputs). The system also includes a new mapping layer module configured to map the small size chunks in the coalesced chunks. The system additionally includes a flushing module configured to flush the chunks by allocating large chunks based on a chunk size coalescence or on a check point hit in terms of a SPA Sync. The system may further comprise a chunked block pointer and a regular block pointer configured to co-exist in dual process threads. The system may yet comprise a plurality of separate coalesced data chunks and a plurality of separate coalesced metadata chunks. The system may still comprise a recompactor configured to identify chunks with a maximum sub-chunks free and to rewrite their data in a new chunk and free the old chunk to make space available. The coalesced chunks may comprise a unique logical chunk ID, a data checksum, a data protection type and an array of sub-chunk headers.

A non-transitory processor-readable storage medium is disclosed having one or more instructions which when executed by at least one processing circuit causes the at least one processing circuit to coalesce a plurality of small read and write chunks into reasonably sized chunks up to 1 MB chunks without any small size I/Os (input/outputs). The one or more instructions also cause the at least one processing circuit to create a new mapping layer configured to map the small size chunks in the coalesced chunks. The instructions additionally cause the at least once processing circuit to flush the chunks by allocating large chunks based on a chunk size coalescence or a check point is hit in terms of a SPA Sync.

Other aspects and advantages of embodiments of the disclosure will become apparent from the following detailed description, taken in conjunction with the accompanying drawings, illustrated by way of example of the principles of the disclosure.

Throughout the description, similar reference numbers may be used to identify similar elements in the several embodiments and drawings. Although specific embodiments of the invention have been illustrated, the invention is not to be limited to the specific forms or arrangements of parts so described and illustrated. The scope of the invention is to be defined by the claims herein and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure, the term 'resilvering' refers to the process of moving data from one device to another device to remirror, or rebuild a RAID drive set. Also the term 'coalesce' used throughout the disclosure refers to the act of merging two adjacent free blocks of memory.

In regular non-ZFS (ZetaByte File System) RAID (Array Disks), data is always written in full stripe sizes. If the full stripe size is not present during the I/O, it reads the rest of the parts of the stripe from storage and converts it into the full stripe. Thus, every unaligned I/O becomes a read-modify-write operation making the writes, especially sub-stripe size random I/Os read-bound, and hence, poorly performing. ZFS uses dynamic raid striping to avoid doing read/modify write when an I/O size is not aligned to a stripe size. Every I/O is converted into a stripe of dynamic size. This policy alleviates the write bandwidth issue.

In a ZFS, the I/O and the allocations are done at the filesystem block size level granularity. Hence, dynamic parity works very well for writes especially for larger block size I/Os. For small block size I/Os and regular read performance, coupled with I/O unit alignment at much smaller size, it also presents a read—I/O performance scaling issue or storage in-efficiency. The I/O is received at the top level virtual device which represents the RAID device. The device is divided in minimum I/O unit size, and parity columns are added.

I/O and Dynamic Parity

Figure 1:
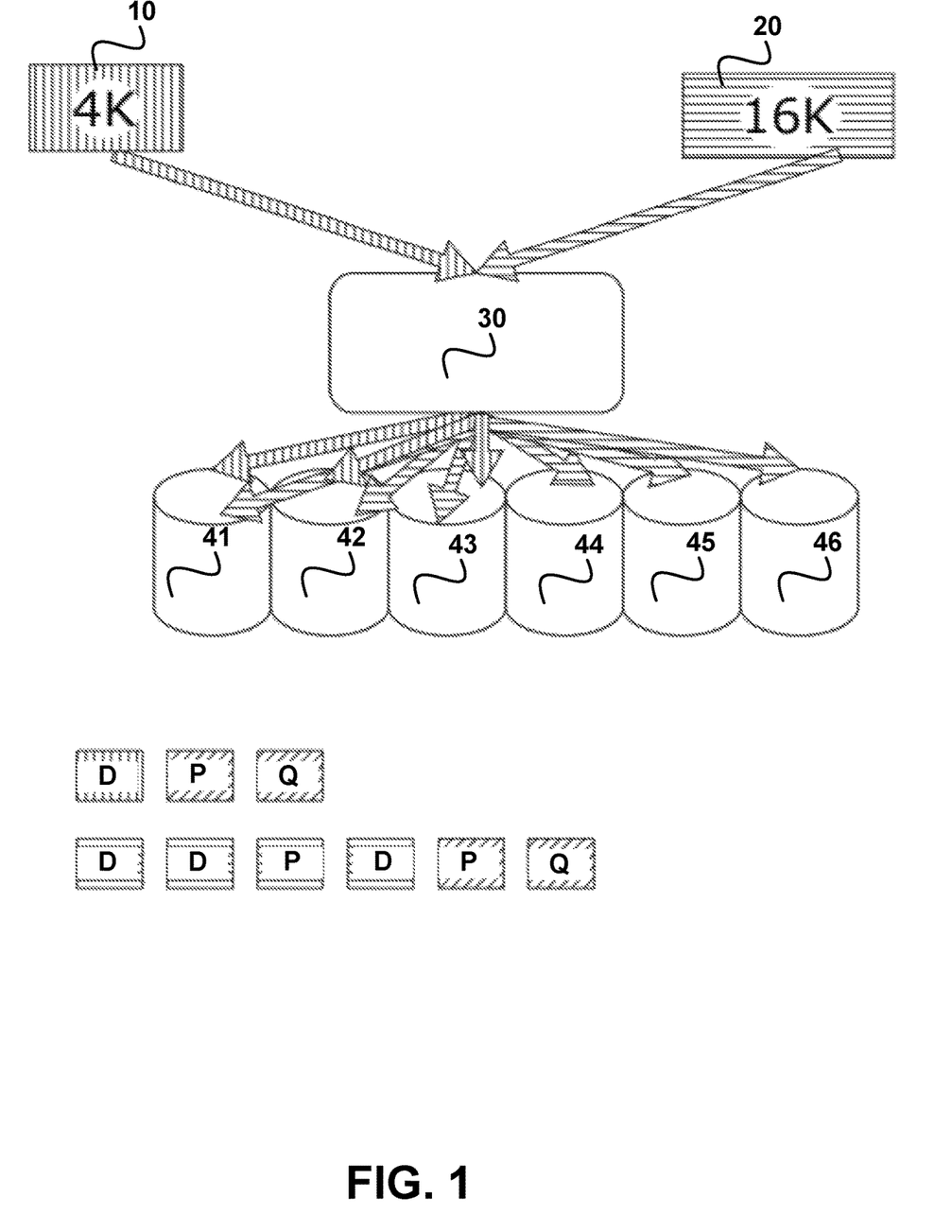
FIG. 1 depicts the dynamic parity working when a device I/O unit size is 4K and 16K and how the devices fan out in the file system disks in accordance with an embodiment of the present disclosure.

FIG. 1 depicts the dynamic parity working when a device I/O unit size is 4K and 16K and how the devices fan out in the file system disks in accordance with an embodiment of the present disclosure. Two sample I/Os, reference numbers 10 and 20, of 4K and 16K write sizes and how they fan out from device 30 into devices 41:46 are depicted. The exemplary drawing represents how the space consumption gets inflated in the dynamic parity RAID. For small size 4K I/Os, it generates 3 columns of device I/Os 1 for data D, and 2 for RAIDZ2, P, and Q parities. Thus, every 4K I/O consumes 12K of the space. If the majority of the I/Os are small sized, this space inflation becomes a huge bloat and does not follow the standard RAID math for space efficiency.

Space Inflation

Figure 2:
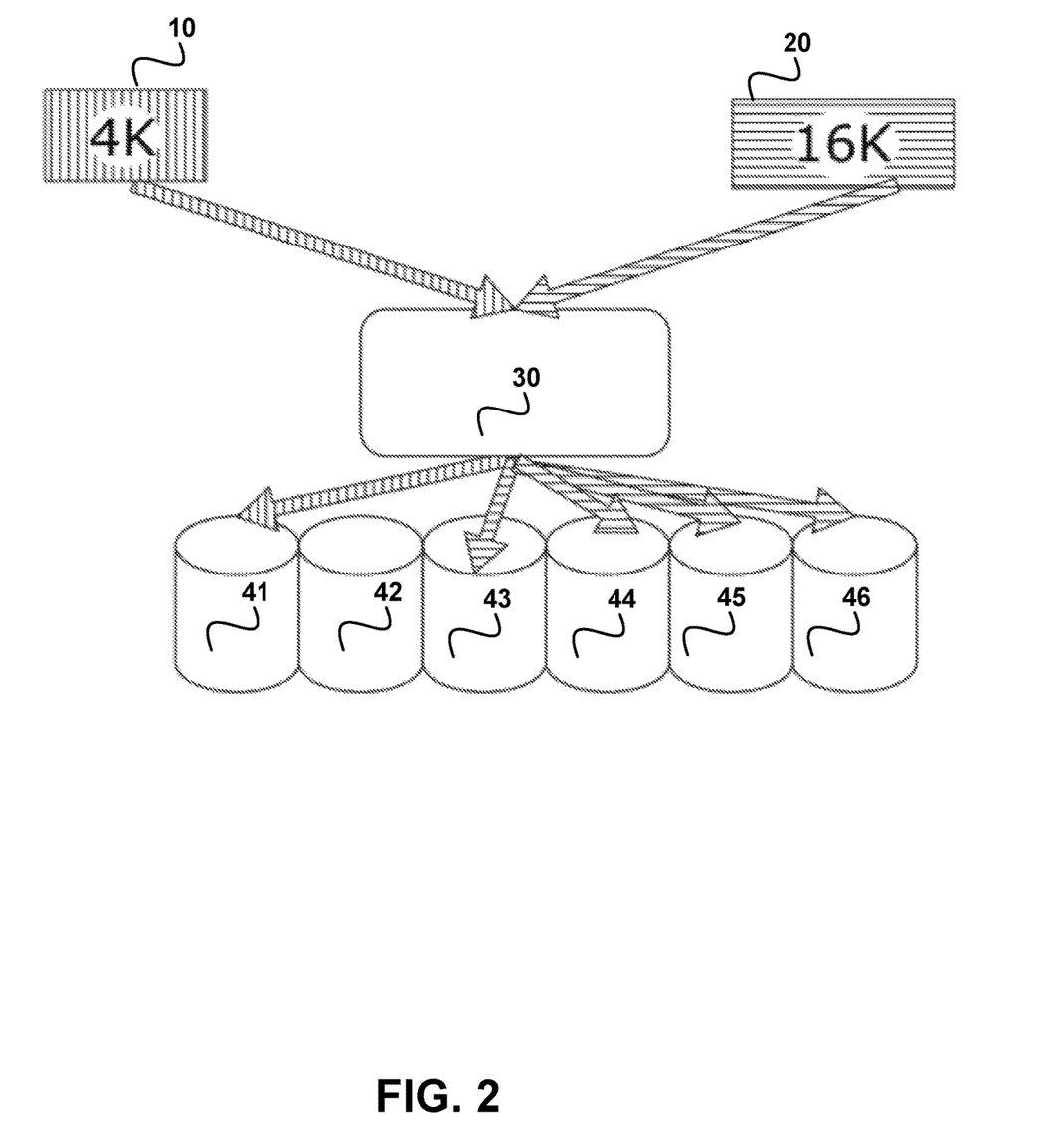
FIG. 2 depicts how read I/Os are served in the dynamic parity RAID using the same 4K and 16K write I/Os done in FIG. 1 in accordance with an embodiment of the present disclosure.

FIG. 2 depicts how Read I/Os are served in the dynamic parity RAID using the same 4K and 16K write I/Os done in FIG. 1 in accordance with an embodiment of the present disclosure. Reference numbers are same for same and or similar components depicted in FIG. 1 described above. From the read I/O, the functional translation provides the device on which the data columns reside. In case of read I/Os, in all healthy device paths, parity columns are not read. As it is evident from the 16K read, that the read is distributed in the device I/O unit sizes. Hence, every such read inflates the I/Os being done on the device. With random read I/Os, the read I/O inflation becomes the performance bottleneck.

Slow Rebuild Resilvering

Figure 3:
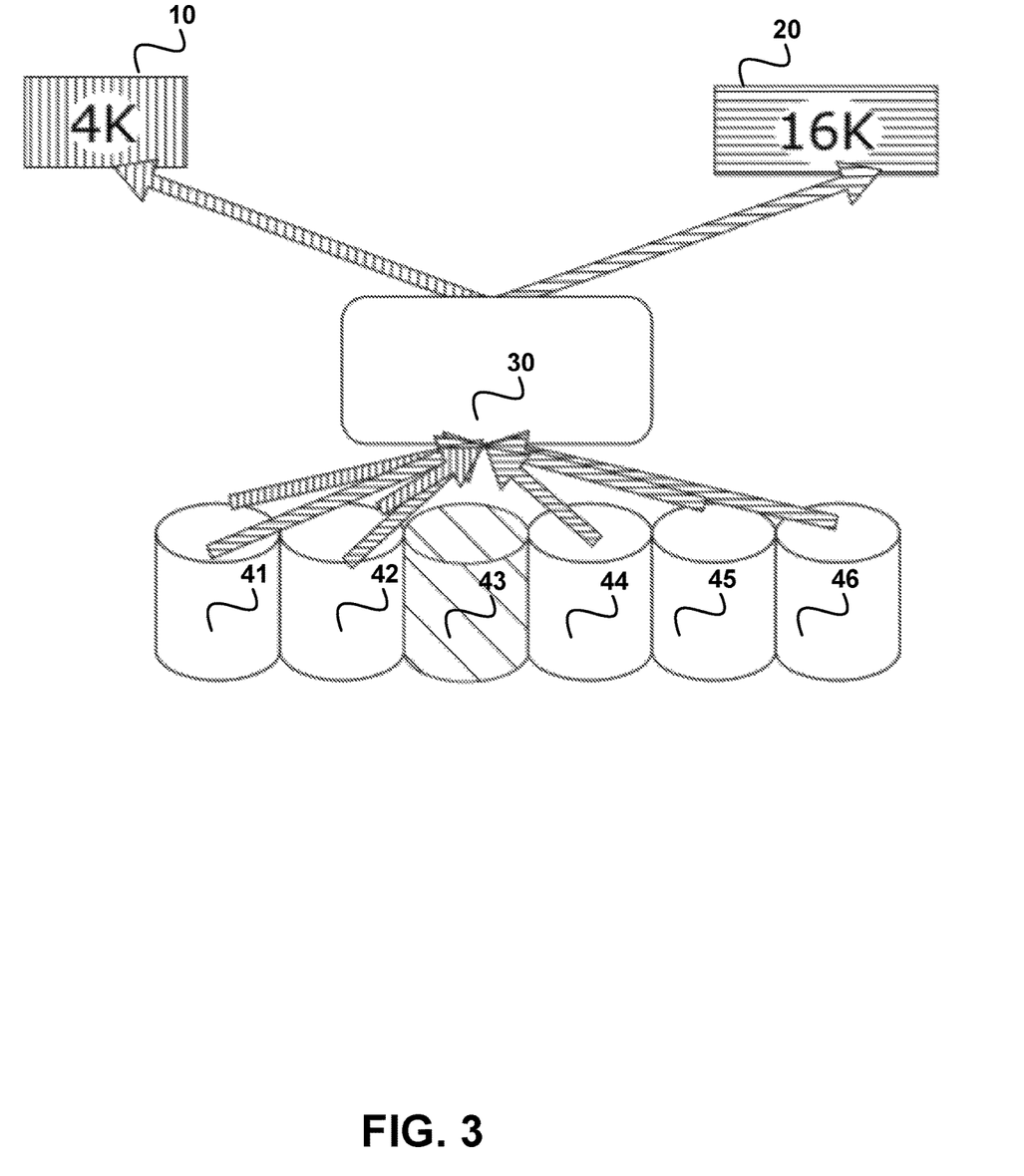
FIG. 3 depicts a resilvering process in RAID done by a Merkel tree walk starting from the root in terms of block pointers in accordance with an embodiment of the present disclosure.

FIG. 3 depicts a resilvering process in RAID done by a Merkel tree walk starting from the root in terms of block pointers in accordance with an embodiment of the present disclosure. Reference numbers are same for same and or similar components depicted in FIG. 1 described above. The block pointer represents the basic I/O unit from logical FS perspective. Using the running example of 4K and 16K I/Os, the depicted diagram represents what happens during resilvering when a device fails. As depicted, for every logical FS unit, the read is issued for all the columns present in healthy devices. During this process, the read I/Os are issued in device I/O unit terms, inflating the total reads being issued on the devices. This quickly becomes the read-bound I/O bottleneck performing very poorly. As also depicted in FIG. 3, the basic problem arises from small sized I/Os being serviced on the end-devices.

Intelli-RAID Design

The disclosed Intelli-RAID (i-RAID) retains the dynamic parity and addressed the small I/O issue. The core idea is to coalesce the small writes in reasonably sized chunks (upto 1 MB chunk). Such end-devices don't get any small size I/Os. A new mapping layer, a chunk map header indexing, is created to map the small-sized chunks in the coalesced chunks. When the chunk-size is coalesced or when the consistency check point is hit ("spa sync", or storage pool allocator (SPA) synchronization, in ZFS terms), it flushes the chunks by allocating large chunks. The dynamic parity algorithm is applied on the coalesced chunk which generates the parities and data fragment columns in reasonably big sized chunks. An appropriate chunk header is created to maintain the mapping.

Figure 4:
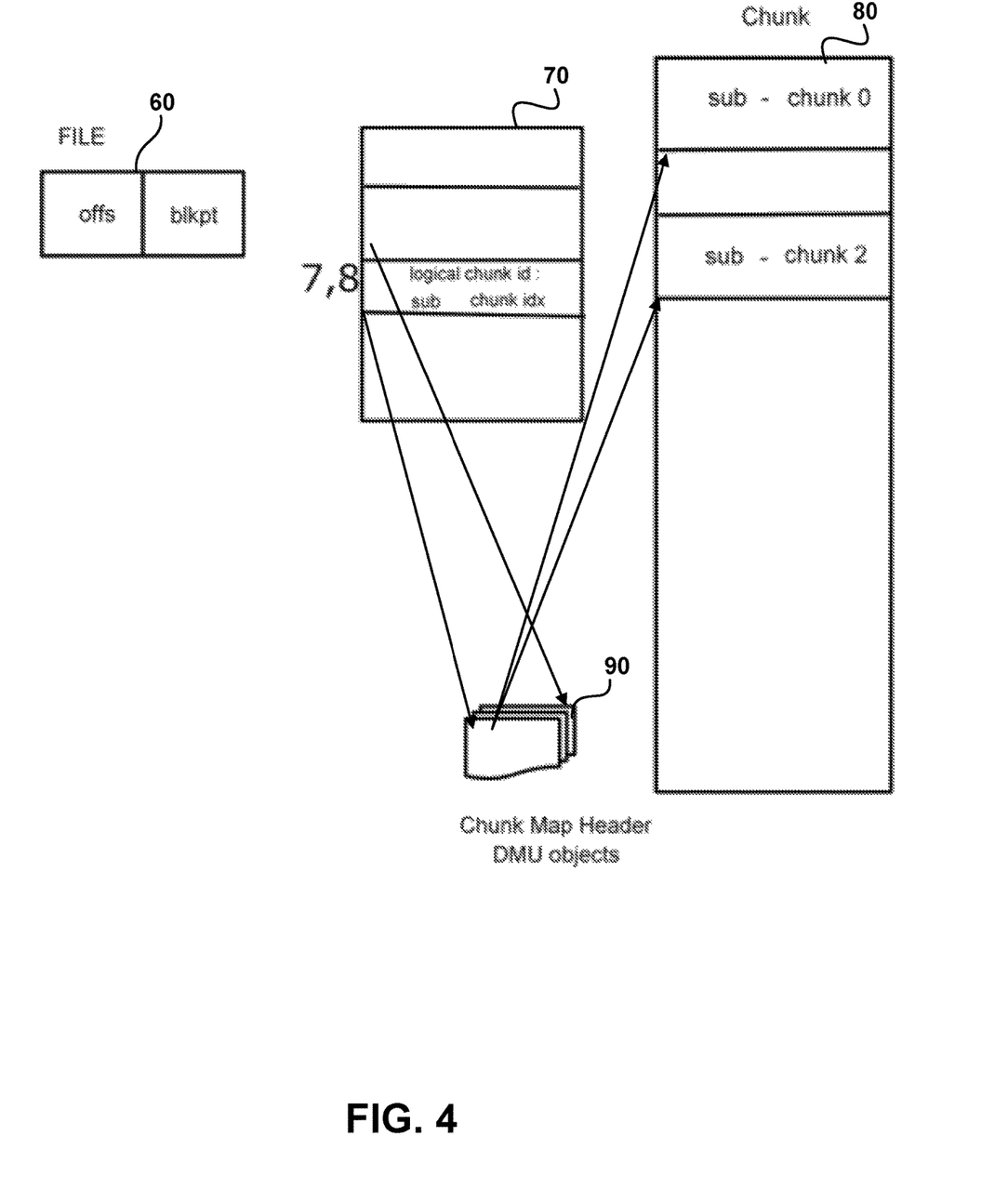
FIG. 4 is a block diagram of fixed size chunks assembled in contiguous data vectors in relation to the header and metadata for the data array in accordance with an embodiment of the present disclosure.

FIG. 4 depicts the access flow in accordance with an embodiment of the present disclosure. The regular block pointer (blkptr_t) used in directories and files 60, now point to a logical chunk ID 70 and the offset in the chunk in the DVA fields of the blkptrs. The DVA fields also contain a bit indicating the block pointer is of chunk type. This allows the chunked blkptr_t and regular blkptr_t to co-exist in dual process threads. During the read flow, the blkptr will read the embedded chunkid to first read the chunk header 90 by looking up the header index object maintained for every chunk id. From the chunk-header, and, sub-chunkid 80, it finds out the mapping on the end-devices.

Each Chunk Map Header is a 4K size structure which describes the details about the chunk. It maintains a unique logical chunk id, data checksum, data protection type (RAID types for now), and an array of sub-chunk headers. Each sub-chunk is identified uniquely by an 8 byte field which includes the chunk ID (54 bits) and the 10 bit sub-chunk count ID.

Chunk ID Management

Figure 5:
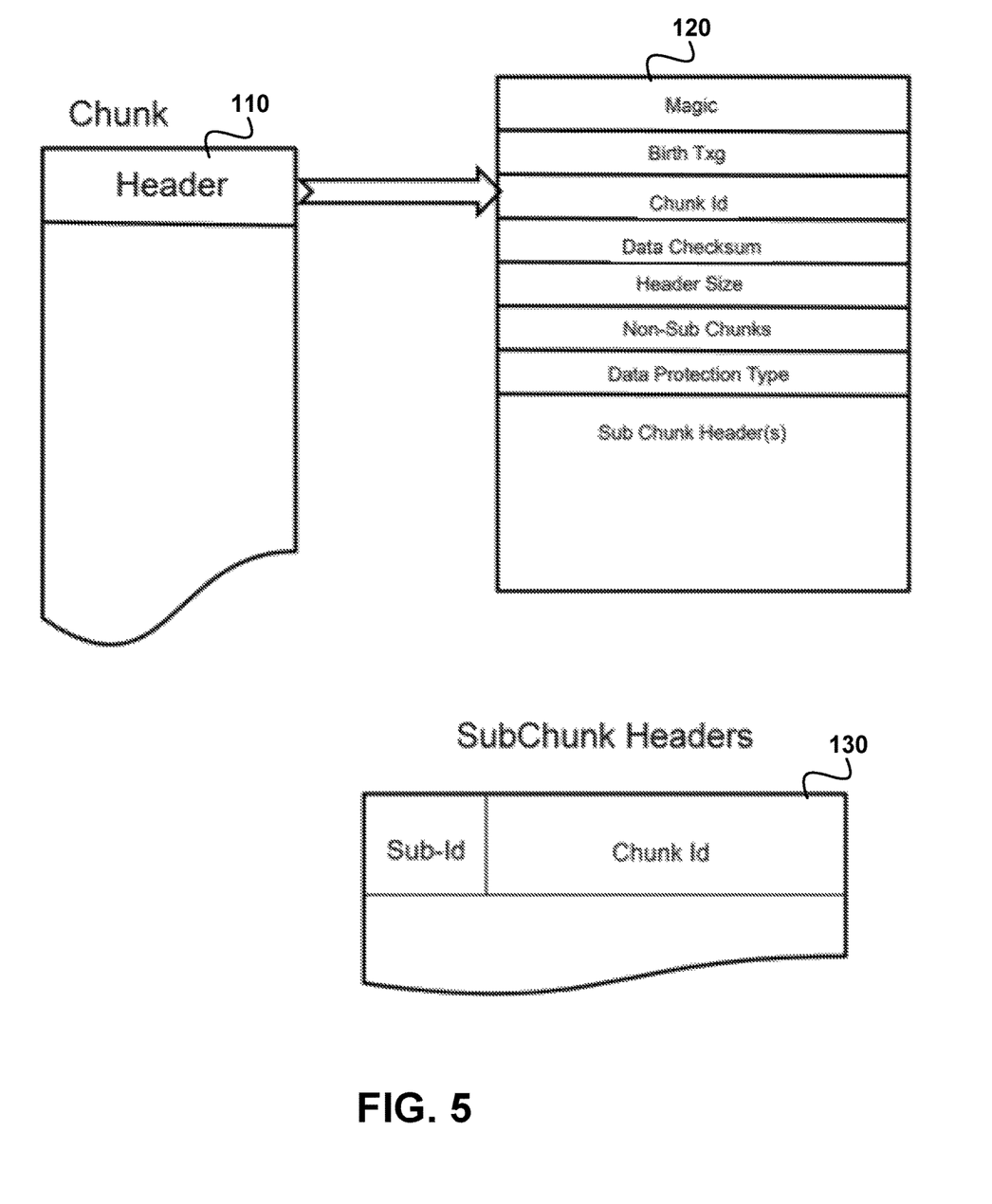
FIG. 5 depicts a Chunk map header as a 4K size data entry in accordance with an embodiment of the present disclosure.

FIG. 5 depicts a Chunk map header as a 4K size data entry in accordance with an embodiment of the present disclosure. These headers 110 are stored in a object (like a regular file object) 120. For parallelism and better scaling, a fixed number of multiple such objects are maintained for a pool. Unique Chunk Id 130 is generated by combining the offset of the chunk-map logical offset location with the logical Data Management Unit (DMU) object-Id. The top few bits of the Chunk-Id identify the DMU object while the rest of the Chunk id bits represent the logical block id in 4 k block units. This simplifies the chunk-id generation which becomes automatically extensible, and, dynamic, and, physically indexed via radix tree lookup. The data in these objects are always appended and, hence, a radix tree remains optimal to the growth of the object as the radix tree spa is very compact.

The header depicted comprises a magic field, a birth transaction (txg) field, a chunk ID field, a data checksum field, a header size field, a num-sub chunks field, a data protection type field and a sub chunk header(s) field. The SubChunk Headers comprise a sub-id and a chunk ID field.

Write Flow

The data chunks and metadata chunks are coalesced separately. This design allows flexible and dynamic Quality of Service enforcement by the data type. The chunk size, placement, and, servicing can get different service classes to achieve the optimal performance for the pool.

The transaction path remains unchanged in the new design. It is the actual data sync phase (called spa sync) which is intercepted. The small-writes are queued in memory data or meta chunk as appropriate. When the chunk fills up, the chunk flush is initiated asynchronously. At this time, the allocator is consulted to find out the most optimal chunk-size for device configuration (dynamically done for every chunk). All the sub-chunks getting queued to the chunk create the logical block pointer with the DVA (disk virtual address) information from the chunk allocation information.

Before spa sync finishes, any partial sub-chunk is flushed and persisted on the backend. This scheme can be enhanced later by utilizing the NVRAM for staging and writing it when the chunk fills up as an optimization.

Read Flow

When a chunked blkptr is accessed, the chunk bit in the DVA grid field is looked up. If it points to the chunk id, the chunk map-header is lookup up by the ChunkId. The chunk map header points to the back-end location where the data is stored.

Resilvering

The regular resilvering design has been redesigned to utilize the new design to derive the maximum benefit of the chunked RAIDs. When resilvering kicks in, the chunk map walk is done first. The chunk map walks is by the logical offset order, and, in full chunk sizes, thus providing both temporal locality and big I/O advantage while resilvering. During this phase of the resilvering, the underlying devices are bandwidth bound resulting in the very optimal resilvering performance. After chunk walk is finished, the regular walk starts. During this walk, chunked block pointers are skipped.

Free Operation and Re-Compaction

Figure 6:
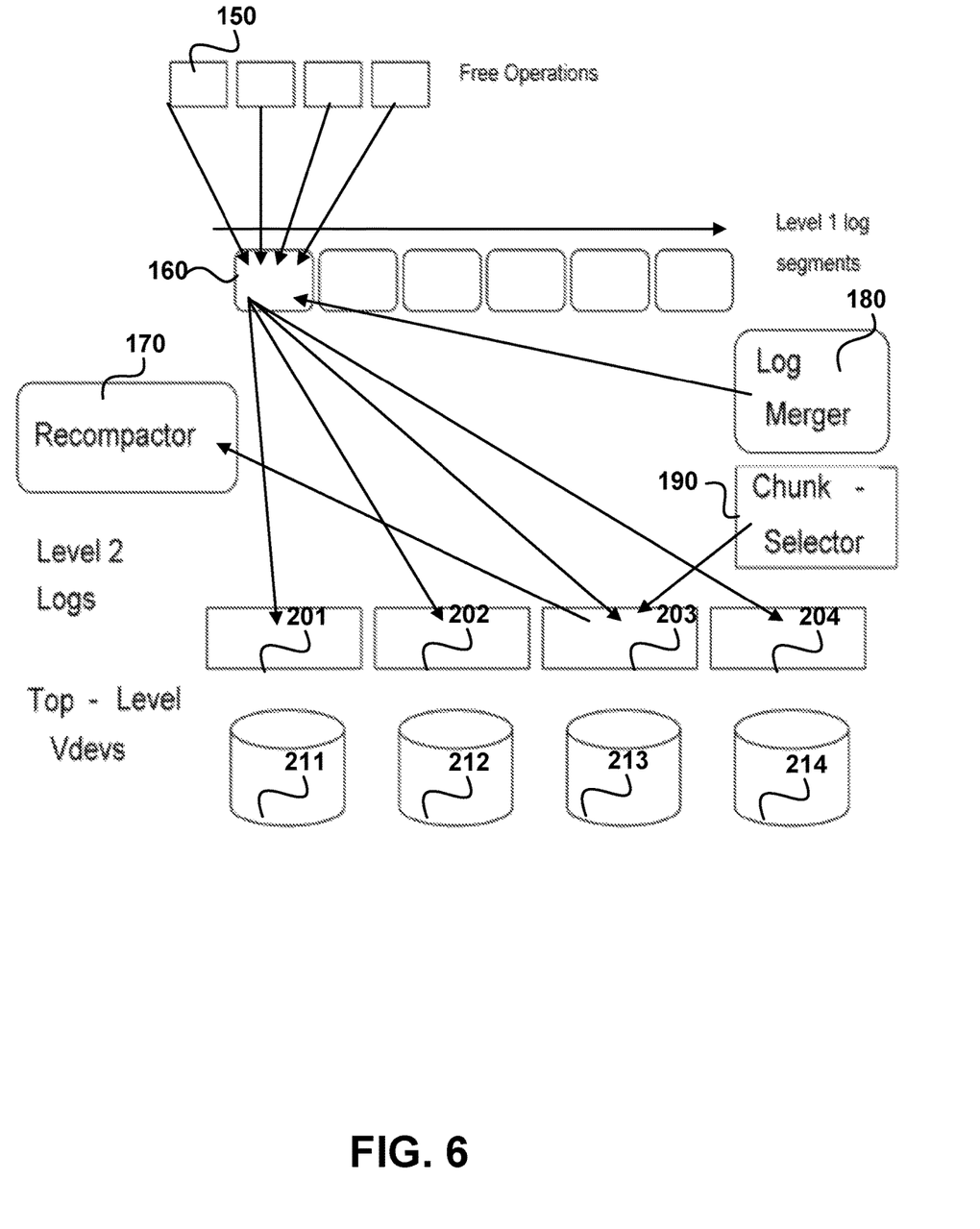
FIG. 6 depicts a free operation and recompaction in accordance with an embodiment of the present disclosure.

FIG. 6 depicts a free operation and recompaction in accordance with an embodiment of the present disclosure. Free is the most complex operation in the new design because one sub-chunk free 150 cannot be freed underneath especially if it is RAID data protection. The parity computation, rebuild and error handling must be done in full chunks. This will create a scenario where deletion operation does not free any chunk as all the frees are scattered. To generate free space in this case, an operation called recompaction is done. During recompaction operation, the chunks with maximum sub-chunks frees are discovered, their data is re-written in a new chunk, and, the old chunk is then freed, making space available.

When the blkptr is deleted, a deletion log is inserted in the space_map_free_chunk log with chunk id and stream id information. This log called L1 log 160 is serially appended and processed when space and/or memory thresholds meet. This L1 log 160 is merged by log merger 180 and the chunk selector 190 into dva offset indexed L2 logs. These L2 logs 201:204 are used later by the recompacter module 170 to find the eligible chunk for recompaction. Top level virtual devices 211:214 may serve as end devices.

Recompaction

When the chunk usage falls below certain threshold or the space usage falls below certain levels, the recompaction process is initiated. Alternatively, when log size becomes very large, the log is processed. The chunks with enough freeable space are recompacted. More details will follow on this.

Figure 7:
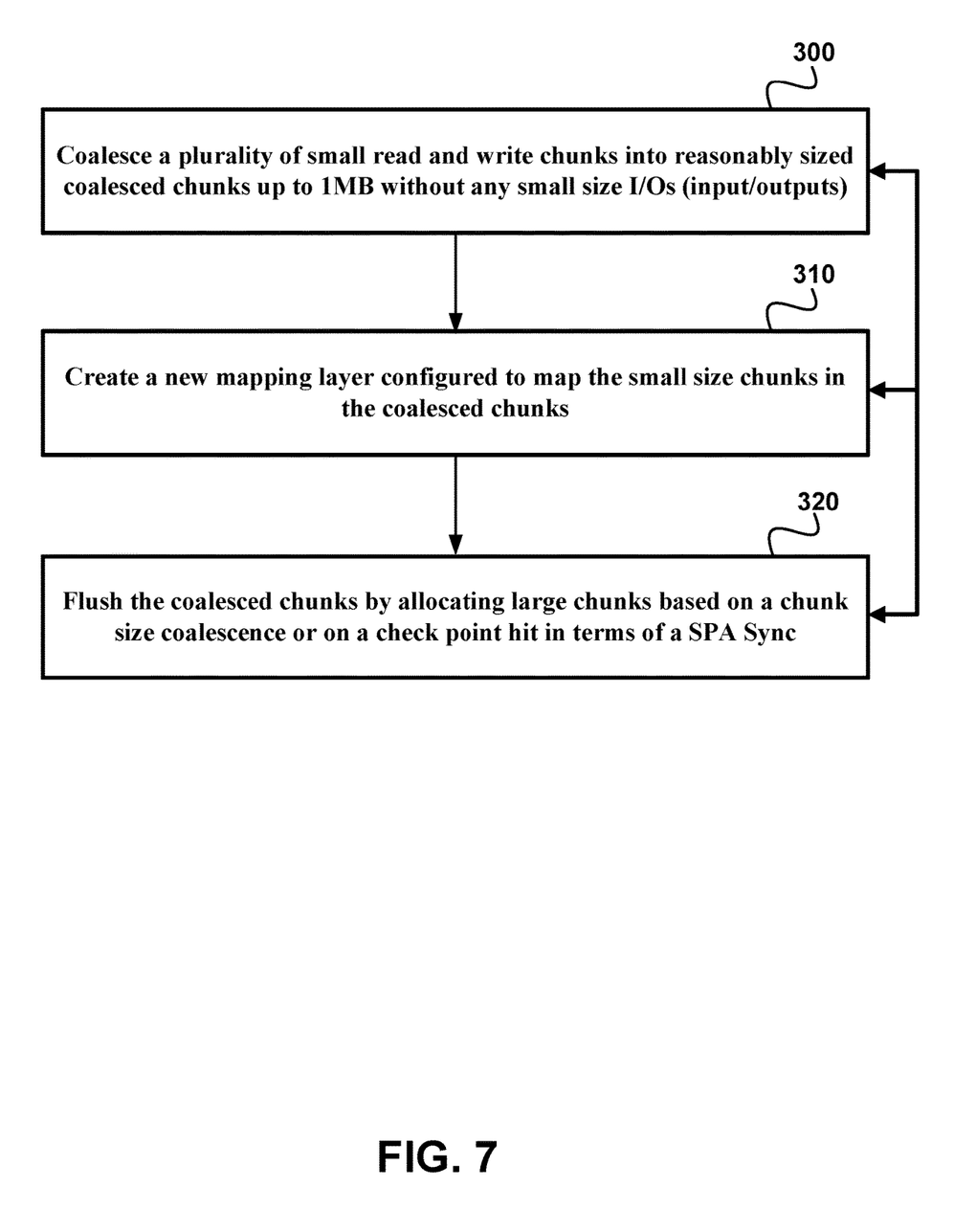
FIG. 7 is a flow chart of in accordance with an embodiment of the present disclosure.

FIG. 7 is a flow chart of a method for managing a RAID file system memory in accordance with an embodiment of the present disclosure. The disclosed method comprises 300 coalescing a plurality of small read and write chunks into reasonably sized coalesced chunks up to 1 MB without any small size I/Os (input/outputs). The method also comprises 310 creating a new mapping layer configured to map the small size chunks in the coalesced chunks. The method additionally comprises 320 flushing the coalesced chunks by allocating large chunks based on a chunk size coalescence or on a check point hit in terms of a SPA Sync.

Figure 8:
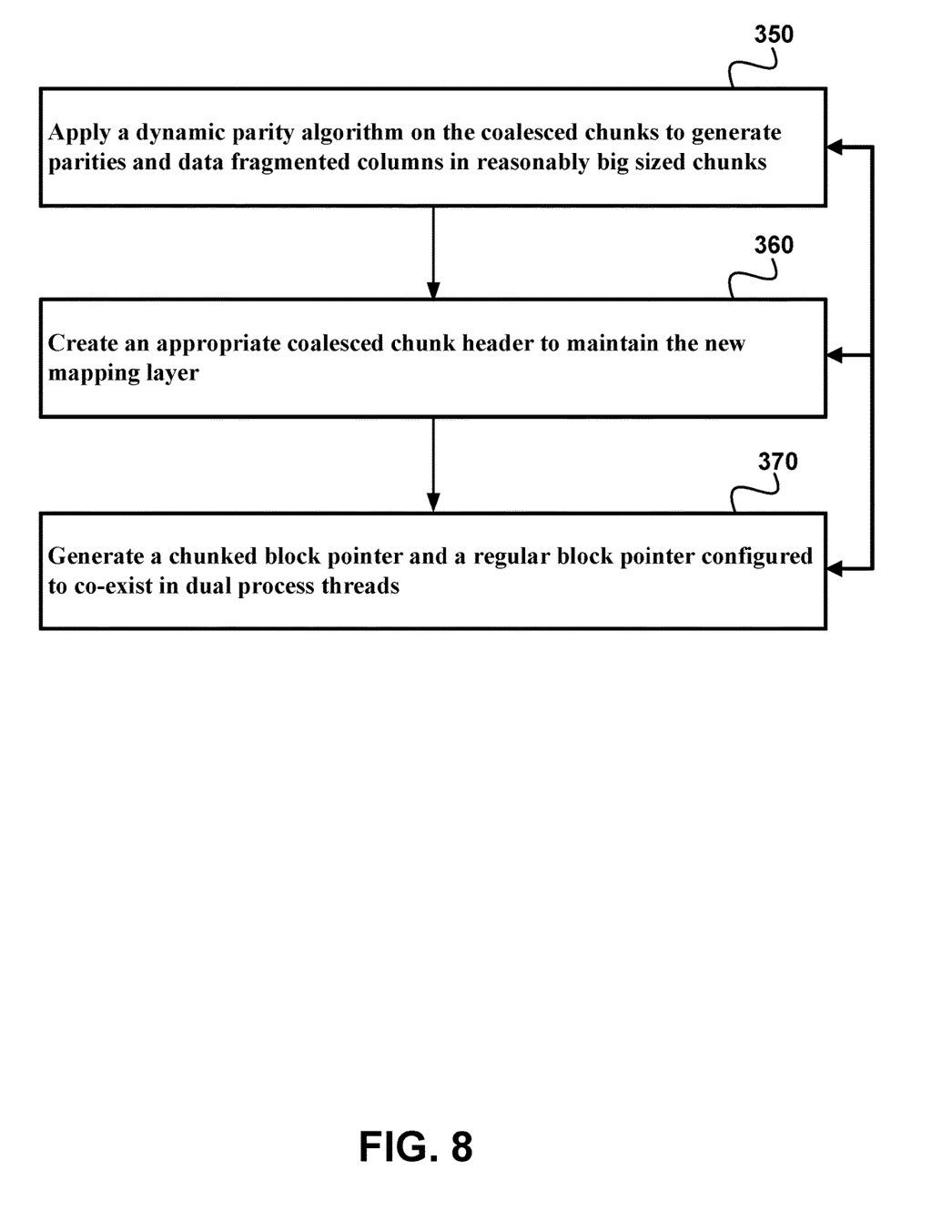
FIG. 8 is another flow chart of a method for intelligent management of a RAID file system memory in accordance with an embodiment of the present disclosure.

FIG. 8 is a flow chart of another method for managing a RAID file system memory in accordance with an embodiment of the present disclosure. The method may also further comprise 350 applying a dynamic parity algorithm on the coalesced chunks to generate parities and data fragmented columns in reasonably big sized chunks. The method may yet comprise 360 creating an appropriate coalesced chunk header to maintain the new mapping layer. The method may still comprise 370 generating a chunked block pointer and a regular block pointer configured to co-exist in dual process threads.

Figure 9:
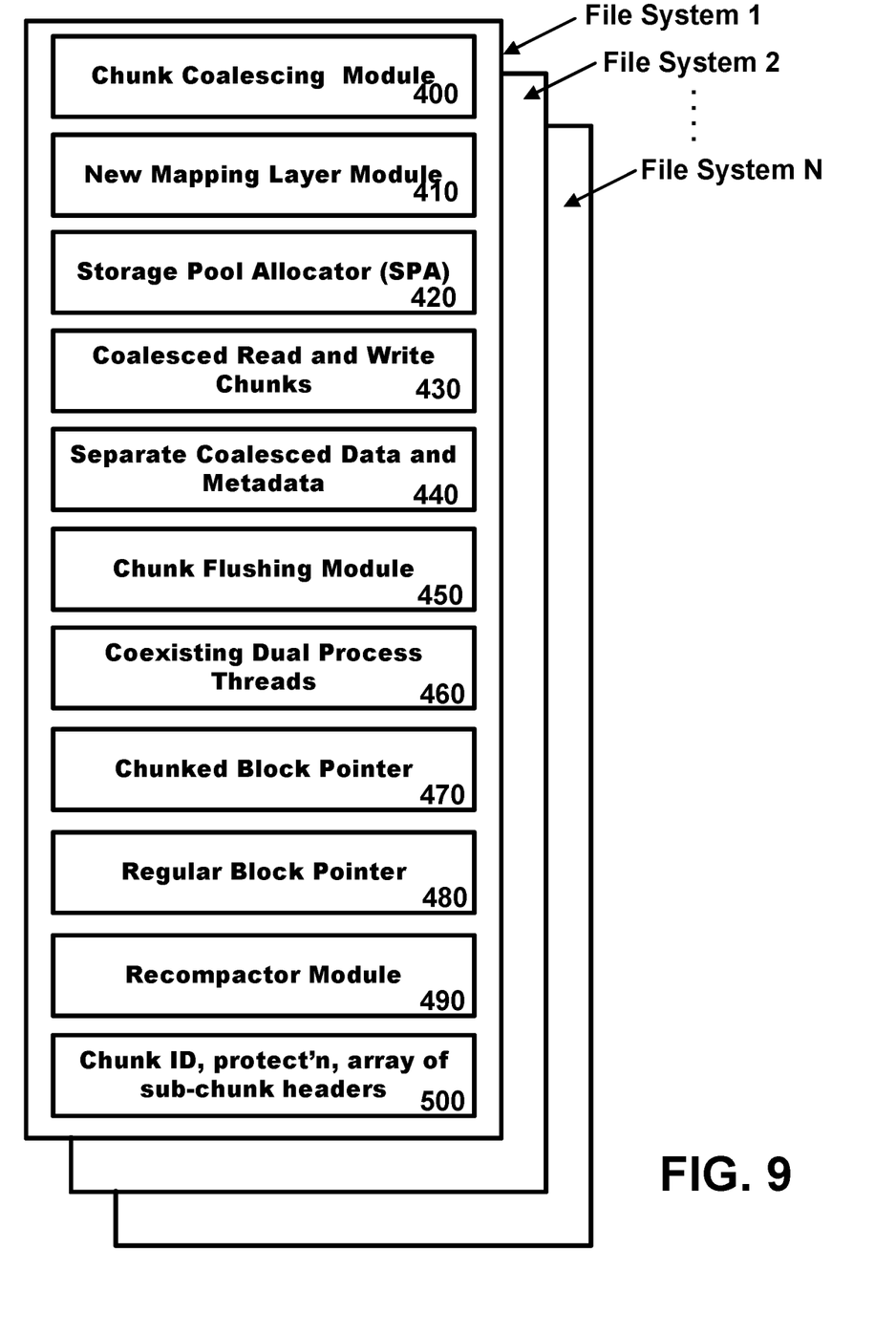
FIG. 9 is a block diagram of components of a system configured to in accordance with an embodiment of the present disclosure.

FIG. 9 is a block diagram of components of a system configured to manage a RAID file system memory in accordance with an embodiment of the present disclosure. The system disclosed comprises a chunk coalescing module 400 configured to coalesce small read and write chunks into reasonably sized coalesced chunks upto 1 MB without any small size I/Os (input/outputs). The system also includes a new mapping layer module 410 configured to map the small size chunks in the coalesced chunks. The system also includes a storage pool allocation module 420. Coalesced read and write data 430 and separate coalesced data and metadata 440 are also included. The system additionally includes a flushing module 450 configured to flush the chunks by allocating large chunks based on a chunk size coalescence or on a check point hit in terms of a SPA Sync. The system may further comprise a chunked block pointer 470 and a regular block pointer 480 configured to co-exist in dual process threads 460. The system may still comprise a recompactor module 490 configured to identify chunks with a maximum sub-chunks free and to rewrite their data in a new chunk and free the old chunk to make space available. The coalesced chunks may comprise a unique logical chunk ID, a data checksum, a data protection type and an array of sub-chunk headers 500.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner. While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A method for managing a redundant array of independent devices (RAID) file system memory, the method comprising:
   a) implementing a file system including a plurality of directories and files, the plurality of directories and files including a plurality of block pointers referencing portions of the RAID file system memory;
   b) coalescing a plurality of small write chunks received from one or more hosts into coalesced chunks;
   c) creating a new mapping layer configured to map the small write chunks in the coalesced chunks, the new mapping layer including chunk headers for the coalesced chunks, the chunk header for each coalesced chunk referencing identifiers of the small write chunks of the each coalesced chunk;
   d) flushing the coalesced chunks by allocating chunks in the RAID file system which are based on each respective coalesced chunk size or on a check point size corresponding to a storage pool allocator (SPA) Sync phase; and
   e) referencing the coalesced chunks in the plurality of directories and files using first block pointers of the plurality of block pointers, the first block pointers including a bit indicating that the first block pointers reference coalesced chunks and distinguishing the first block pointers from second block pointers of the plurality of block pointers that do not reference coalesced chunks, the first block pointers referencing the chunk headers for the coalesced chunks.

2. The method for managing the RAID file system memory of claim 1, further comprising applying a dynamic parity algorithm on the coalesced chunks of write chunks received from the one or more hosts to generate parities and data fragmented columns.

3. The method for managing the RAID file system memory of claim 1, further comprising generating the first block pointers and the second block pointers in dual process threads.

4. The method for managing the RAID file system memory of claim 1, wherein the coalesced chunks further comprise a unique logical chunk ID, a data checksum, a data protection type and an array of sub-chunk headers.

5. The method for managing the RAID file system memory of claim 4, further comprising generating a sub-chunk header uniquely identified by an 8-byte field including the unique logical chunk ID and a 10-bit sub-chunk count ID.

6. The method for managing the RAID file system memory of claim 1, further comprising combining a chunk-map logical offset location with a logical data management unit (DMU) object ID to create a unique chunk ID.

7. The method for managing the RAID file system memory of claim 1, further comprising appending data in a plurality of objects with a unique chunk ID configured for a radix tree to allow for growth of the object.

8. The method for managing the RAID file system memory of claim 1, further comprising coalescing data chunks and metadata chunks separately.

9. The method for managing the RAID file system memory of claim 1, further comprising initiating the chunk flushing of each coalesced chunk asynchronously based on queuing sub-chunks of the each coalesced chunk and creating a corresponding logical block pointer with a disk virtual address.

10. The method for managing the RAID file system memory of claim 1, further comprising resilvering via a chunk map walk in full chunk sizes while underlying devices are bandwidth bound and starting another walk which skips chunked block pointers.

11. The method for managing the RAID file system memory of claim 1, further comprising generating a L1 chunk deletion log, wherein the L1 chunk deletion log is merged into a plurality of disk virtual address (DVA) offset-indexed L2 logs.

12. The method for managing the RAID file system memory of claim 1, further comprising identifying a plurality of disk virtual address (DVA) offset-indexed L2 logs used by a recompactor module to find an eligible chunk for recompaction.

13. A system for managing a redundant array of independent devices (RAID) file system memory, the system comprising:
   means for implementing a file system including a plurality of directories and files, the plurality of directories and files including a plurality of block pointers referencing portions of the RAID file system memory;
   means for coalescing small write chunks received from one or more hosts into coalesced chunks;
   means for mapping the small write chunks in the coalesced chunks in a chunk header referencing identifiers of the small write chunks;
   means for flushing the chunks by allocating chunks in the RAID file system which are based on each respective coalesced chunk size or on a check point size corresponding to a storage pool allocator (SPA) Sync phase; and
   means for referencing the coalesced chunks in the plurality of directories and files using first block pointers of the plurality of block pointers, the first block pointers distinguishing the first block pointers from second block pointers of the plurality of block pointers that do not reference coalesced chunks, the first block pointers referencing the chunk headers for the coalesced chunks.

14. The system for managing the RAID file system memory of claim 13, further comprising the first block pointers and the second block pointers being configured to co-exist in dual process threads.

15. The system for managing the RAID file system memory of claim further comprising a plurality of separate coalesced data chunks and a plurality of separate coalesced metadata chunks.

16. The system for managing the RAID file system memory of claim 13, wherein the coalesced chunks further comprise a unique logical chunk ID, a data checksum, a data protection type and an array of sub-chunk headers.

17. A non-transitory processor-readable storage medium having one or more instructions which when executed by at least one processing circuit causes the at least one processing circuit to:
   a implement a file system including a plurality of directories and files, the plurality of directories and files including a plurality of block pointers referencing portions of a redundant array of independent devices (RAID) file system memory;
   b) coalesce a plurality of small write chunks received from one or more hosts into coalesced chunks;
   c) create a new mapping layer configured to map the small write chunks in the coalesced chunks, the new mapping layer including a chunk header referencing identifiers of the small write chunks;
   d) flush the chunks by allocating chunks in the RAID file system which are based on each respective coalesced chunk size or a check point size corresponding to a storage pool allocator (SPA) Sync phase; and e) reference the coalesced chunks in the plurality of directories and files using first block pointers of the plurality of block pointers, the first block pointers including a bit indicating that the first block pointers reference coalesced chunks and distinguishing the first block pointers from second block pointers of the plurality of block pointers that do not reference coalesced chunks, the first block pointers referencing the chunk headers for the coalesced chunks.

* * * * *